United States Patent [19]

Bowman

[11] Patent Number: 4,828,328

[45] Date of Patent: May 9, 1989

[54] REPLACEMENT WHEEL BEARING SPINDLE

[76] Inventor: Dan H. Bowman, Beaumont Rd., Rte. 2, Box 233, Ringgold, Ga. 30736

[21] Appl. No.: 189,639

[22] Filed: May 3, 1988

[51] Int. Cl.⁴ .............................................. B60B 11/02
[52] U.S. Cl. ................................ 301/130; 301/124 R; 301/131; 301/128; 301/111
[58] Field of Search ............ 301/111, 112, 114, 124 R, 301/130, 131, 132, 36 R, 38 R, 128; 29/402.14, 402.15, 402.16

[56] References Cited

U.S. PATENT DOCUMENTS

| | | | |
|---|---|---|---|
| 1,624,278 | 4/1927 | Olson | 301/128 |
| 3,915,504 | 10/1975 | Bauer | 301/130 |
| 4,455,732 | 6/1984 | Shiets | 301/130 X |
| 4,776,640 | 10/1988 | Rezza | 301/38 R |

Primary Examiner—Robert B. Reeves
Assistant Examiner—Russell D. Stormer
Attorney, Agent, or Firm—Alan Ruderman

[57] ABSTRACT

An accessory spindle for boat trailers or the like for mounting onto a damaged wheel mounting axle spindle of the trailer. The accessory spindle has an exterior surface substantially identical to that of the axle spindle, and has an open end opening into a hollow. The hollow has bores formed therein which mirror the exterior surface of the axle spindle so as to be mounted thereon. Threads on the free end of the axle spindle are threadedly received in a threaded bore within the hollow corresponding to that of the axle spindle free end. Set screws may extend from the exterior of the axle spindle into the hollow adjacent the free end for securely gripping the axle spindle.

7 Claims, 1 Drawing Sheet

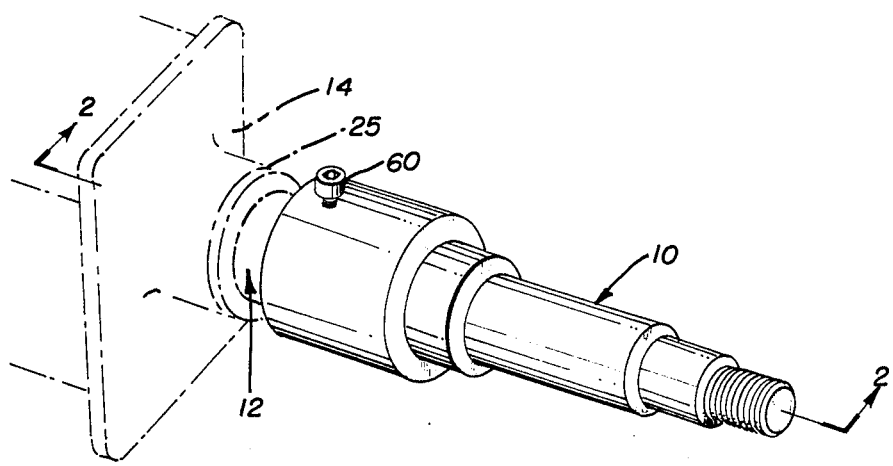
FIG. 1
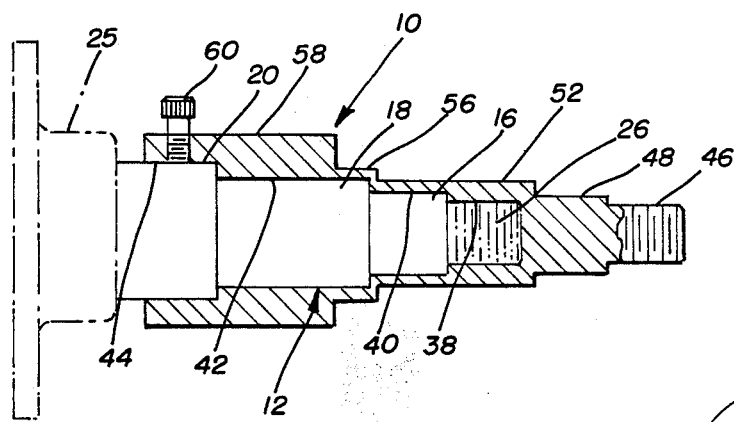
FIG. 2
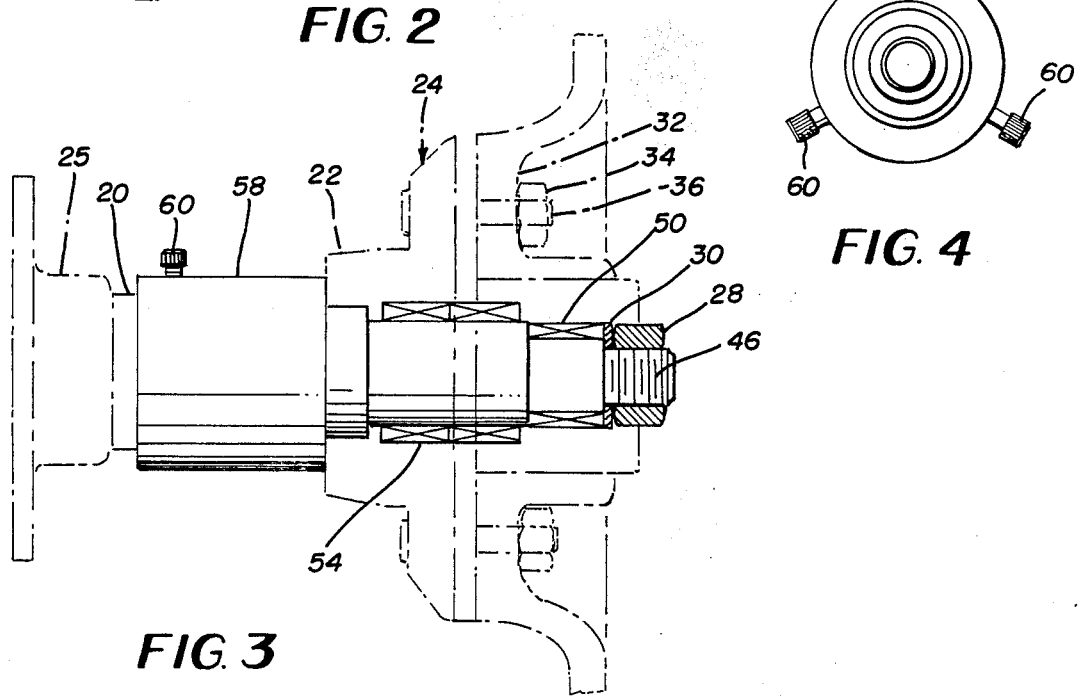
FIG. 4
FIG. 3

REPLACEMENT WHEEL BEARING SPINDLE

BACKGROUND OF THE INVENTION

This invention relates to a replacement wheel bearing spindle which may be an accessory for boat trailers or the like and more particularly to a replacement bearing spindle which may be attached to a damaged bearing spindle at the wheel carrying end of a trailer axle to permit the wheel and new bearings to be mounted on the axle.

On a boat trailer or the like a fixed axle is carried at one end by the trailer chassis and on the other end has an integral spindle which generally carries a pair of bearings at spaced locations. The bearings have inner races fastened to the spindle and outer races on which a wheel is mounted for rotation relative to the spindle. A tire hub is fastened to the wheel, supports the trailer and rotates relative to the trailer chassis. When a bearing fails or "burns-out" the heat generated resulting from the friction created while the trailer is being pulled and before the failure is noticed, tends to damage the spindle by enlarging the diameter of the surface which seats the inner race of the bearing. When this occurs the trailer cannot be moved since a spare new set of bearings will not be received on the spindle seating surface and the trailer must be towed at great expense for subsequent replacement of the axle. If an axle is not available at the repair station, the trailer may be out of commission for some time.

Although such failures appear to occur relatively frequently, solutions to place the trailer back into service even temporarily do not appear to have been provided by the prior art. A solution to this problem must of course be simple enough to perform in the field while the trailer is on the road and be cost effective.

SUMMARY OF THE INVENTION

Consequently, it is a primary object of the present invention to provide a substitute or replacement spindle which may be positioned onto a damaged spindle of an axle for receiving new wheel bearings when, due to failure of the original bearings, the spindle is damaged and cannot accept the new bearings.

It is another object of the present invention to provide as an accessory for boat trailers and the like having a wheel axle including a spindle on which wheel bearings are mounted, a replacement wheel spindle positionable on the axle spindle for receiving new bearings when, due to failure of the original bearings, the axle spindle is damaged and cannot accept the new bearings.

Accordingly, the present invention provides an accessory for boat trailers and the like for mounting onto a damaged wheel mounting spindle at the end of an axle of the trailer, the accessory being a substitute spindle which fits over and is secured to the damaged spindle after the bearings on the damaged spindle are removed. The substitute spindle has an exterior surface including precise seats for mounting new wheel bearings and the wheel to which the hub of the trailer tire may be fastened. Thus, when an axle spindle is damaged by a failure of one or more of the bearings and is deformed so as not to be capable of mounting new bearings, the substitute spindle may be fastened to the damaged spindle and the new bearings together with the wheel may be mounted on the substitute spindle. The tire may then be fastened to the wheel so that the trailer can again function for its intended purpose until it is feasible to replace the damaged axle. In this manner towing of the trailer, together with the cost thereof, is avoided and the trailer may still be used until it is more convenient to replace the axle.

The interior of the accessory or substitute spindle is configured to be positioned onto the axle spindle and thus has a hollow interior including bores or recesses which mirror the exterior surface of the axle spindle. Preferably the accessory spindle has an internally threaded recess which threadedly cooperates with the external threads on the end of the axle spindle which normally receives a nut for securing the wheel thereon, the threaded members acting to attach the accessory onto the axle spindle, and additional means may be provided to secure the member together, while the end of the accessory spindle includes threads to receive the wheel securing nut.

BRIEF DESCRIPTION OF THE DRAWINGS

The particular features and advantages of the invention as well as other objects will become apparent from the following description taken in connection with the accompanying drawings, in which:

FIG. 1 is a perspective view of an accessory spindle constructed in accordance with the principles of the present invention mounted on the damaged spindle of the axle of a boat trailer or the like;

FIG. 2 is a cross sectional view taken substantially along line 2—2 of FIG. 1;

FIG. 3 is an elevational view of the accessory spindle illustrated in FIG. 1 depicting the bearings and a wheel mounted thereon; and FIG. 4 is an end elevational view of the accessory spindle as seen from the closed end.

DESCRIPTION OF THE PREFERRED EMBODIMENT

Referring now to the drawings, an accessory spindle, generally designated at 10, constructed in accordance with the present invention is illustrated mounted on a damaged spindle 12 on the end of an axle 14, the axle 14 being carried by the chassis of a boat trailer or the like (not illustrated). Although the specific configuration of the spindle 12, and thus the accessory spindle 10, may vary with the manufacturer of the trailer or the axle, and the present invention is described in conjunction with one specific axle spindle, it should be understood that the invention is not intended to be limited to that specific configuration which is merely for purposes of disclosure, but may be readily modified in shape to conform to and be used with other axle spindles. Conventionally, the axle spindles are elongated members having surfaces such as the surfaces 16, 18, for mounting respective bearings. Additionally, such axle spindles have cylindrical hub portions 20 which normally are received within an adjacent end 22 of a respective wheel 24, which abuts an enlarged boss 25 of the axle, while the free end of the axle spindle includes threads 26 for receiving a nut 28 which may act together with a retaining washer or the like 30 to lock the bearings and the wheel on the spindle. The hub 32 of a tire rim is fastened to the wheel 24 by nuts 34 threaded onto studs 36 fixed to the wheel 24.

Conventionally, the bearings which are mounted on the axle spindle have inner races fast on the spindle surfaces 16, 18 and outer races to which the wheel 24 is fastened so that the wheel may rotate relatively to the fixed spindle 12. However, when a bearing fails, unless the failure is immediately noticed and the trailer is stopped, the heat generated due to the excessive friction of metal-to-metal contact in many instances will result in the surfaces 16, 18, where the failed bearing is mounted, expanding or enlarging diametrically. This enlargement precludes remounting of one or more new bearings onto the spindle surfaces so that even when new bearings are carried on board, they cannot be fitted onto the spindle 12.

The present invention provides an interim solution to this problem so that the trailer need not be towed or decommissioned at an inconvenient time by providing the replacement spindle 10 as an accessory which may be carried on board the trailer and which may be positioned over the damaged axle spindle as illustrated after the damage bearings are removed therefrom. The replacement spindle comprises an elongated member having a hollow interior including cavities having bores substantially conforming to the exterior surface of the axle spindle 12, but slightly enlarged to allow for the enlargement resulting from the heat due to the failed bearing. The exterior configuration of the replacement spindle conforms substantially to that of the original axle spindle 12 so that the bearings and wheel may be mounted thereon after it is secured on the axle spindle.

Accordingly, the replacement spindle 10 has an open end with an interior hollow including a series of concentric recesses for receiving and fitting about the axle spindle 12. A small diameter bore 38 at the closed end, which may have threads for threadely receiving the threaded end 26 of the axle spindle, opens onto a larger diameter bore 40 for accommodating the bearing surface 16 of the axle spindle. The bore 40 in turn opens onto a large diameter bore 42 for accommodating the bearing surface 18 of the axle spindle and the bore 42 opens onto an even larger diameter bore 44 for receiving the hub portion 20 of the spindle 12.

The exterior configuration of the accessory spindle 10 conforms substantially to the exterior surface of the original axle spindle 12. Thus, it includes a threaded surface 46 at the closed end for threadily receiving the nut 28, a close tolerance diameter surface 48 of the same outside diameter as the undamaged surface 16 for receiving at least one of the new bearings 50 and a close tolerance diameter surface 52 of the same outside diameter as the undamaged surface 18 for receiving at least one of the new bearings 54, the number of bearings of course corresponding to that originally disposed on the surfaces 16, 18. The remainder of the replacement spindle is stepped up to a larger diameter surface 56 such as at the hub 20 of the original axle spindle, and should be stepped up to a maximum outside diameter surface portion 58 overlying the hub 20 and preferably overlying the surface 18. Locking means such as set screws 60 are equally spaced about the portion 58 to secure the replacement spindle 12 to the axle spindle. If desired a safety chain (not illustrated) may be used to ensure that the spindle 12 is secured in the event the set screws should loosen.

For axle spindles of different configuration than that illustrated, in which the exterior configuration and sizes differ from that illustrated, the accessory spindle will have interior and exterior surfaces conforming accordingly. Except for the bearing surfaces some of the other axle spindles may have tapered surfaces and of course so will the replacement spindle. In all cases, however, the bearing surfaces will be cylindrical and the spindle decreases in size from the axle to the free end.

In use, if the trailer axle spindle fails due to overheating, the bearings may be removed from the axle spindle 2 by a bearing puller or other means after the wheel has been removed. Thereafter the replacement spindle 10 is threaded onto the axle spindle and secured with the set screws 60. The new bearings 50, 54 and the original wheel are placed on the spindle 10 and the tire hub and tire are replaced and secured by the nut 28 and the trailer is again mobile. When it is convenient, the axle may be replaced, but since the wheel and tire extend outwardly further then the original amount because of the extension of the spindle 10, the spindle 10 should not be left in place for too long a period.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. An accessory spindle for use with boat trailers or the like having an axle including an axle spindle for mounting at least one bearing for rotatably journalling a wheel, said axle spindle comprising an elongated substantially cylindrical body including a cylindrical hub portion of a first diameter extending from the axle to a cylindrical threaded free end portion of a second diameter smaller than said first diameter for cooperating with a nut which secures the bearing and wheel on the axle spindle, and at least one bearing receiving portion having a cylindrical surface intermediate said hub portion and said threaded end portion of a third diameter intermediate said first and second diameters, said accessory spindle comprising an elongated substantially cylindrical body member having an enlarged end opening into a hollow and a small closed end, said hollow having a series of concentric bores decreasing in diameter from said open end to a well at the closed end, said open end having a bore of cylindrical configuration with an internal diameter substantial equal to that of said first diameter for receiving said hub portion, said well having a bore diameter substantially equal to said second diameter, threads formed about the bore of said well for cooperating with said threaded free end portion of said axle spindle, and a cylindrical bore intermediate said open end and said well having a diameter substantially equal to said third diameter, said accessory spindle having a cylindrical external configuration, said closed end comprising a threaded cylindrical section substantially equal to said second diameter, a section having a cylindrical surface about said open end substantially equal to said first diameter, and a cylindrical surface section intermediate said ends substantially equal to said third diameter, the length of said threaded end section and said cylindrical surface section of said accessory spindle being substantially equal to the threaded end portion and the bearing receiving portion respectively of said axle spindle, whereby said accessory spindle may threadedly receive said axle spindle and provide substantially identical surfaces for mounting said wheel, bearing and nut.

2. An accessory spindle as recited in claim 1, including locking means disposed about said cylindrical surface section adjacent said open end extending into said hollow for securing said accessory spindle to said hub portion.

3. An accessory spindle as recited in claim 1, wherein said axle spindle includes more than one bearing mounting surface intermediate said threaded end and said hub of a fourth diameter, and said accessory spindle includes an internal cylindrical bore of a diameter substantially equal to said fourth diameter and an external cylindrical surface intermediate said threaded end and said hub having a diameter substantially equal to said fourth diameter.

4. An accessory spindle as recited in claim 3, including locking means disposed about said cylindrical surface section adjacent said open end extending into said hollow for securing said accessory spindle to said hub portion.

5. An accessory spindle for use with boat trailers or the like having an axle including an axle spindle, said axle spindle having a plurality of concentric cylindrical surface portions decreasing in diameter from a hub fixed to said axle to a threaded free end, at least one surface portion intermediate said hub and said free end adapted to receive an inner race of a bearing having a wheel mounted on an outer race, said free end adapted to threadedly receive a nut for securing said wheel and bearing on said spindle, said accessory spindle comprising a body member having an enlarged open end and a small externally threaded closed end, a hollow within said body member opening onto said open end, a plurality of concentric cylindrical bores within said hollow having varying diameters and lengths corresponding in size to respective surface portions of said axle spindle so as to be received thereon, said body member having an exterior configuration including a plurality of concentric cylindrical surfaces of varying diameters and lengths corresponding in size to respective surface portions of said axle spindle, and means for securing said accessory spindle on said axle spindle, whereby said accessory spindle may be mounted on said axle spindle and said bearing, wheel and nut may be mounted on said accessory spindle.

6. An accessory spindle as recited in claim 5, wherein said means for securing said accessory spindle to said axle spindle comprises internal threads on the walls of a bore in said hollow corresponding to the threaded free end of said axle spindle for threadedly receiving said threaded free end.

7. An accessory spindle as recited in claim 6, wherein said means for securing said accessory spindle to said axle spindle further comprises locking means disposed about a cylindrical surface adjacent said open end and extending into said hollow for securing said accessory spindle to said hub of said axle spindle.

* * * * *